3,119,005
ELECTRIC RESISTANCE SEAM WELDER
Joseph J. Riley and Foster R. Woodward, Warren, Ohio,
    assignors to The Taylor-Winfield Corporation, Warren,
    Ohio, a corporation of Ohio
        Filed Feb. 14, 1962, Ser. No. 173,175
            6 Claims. (Cl. 219—82)

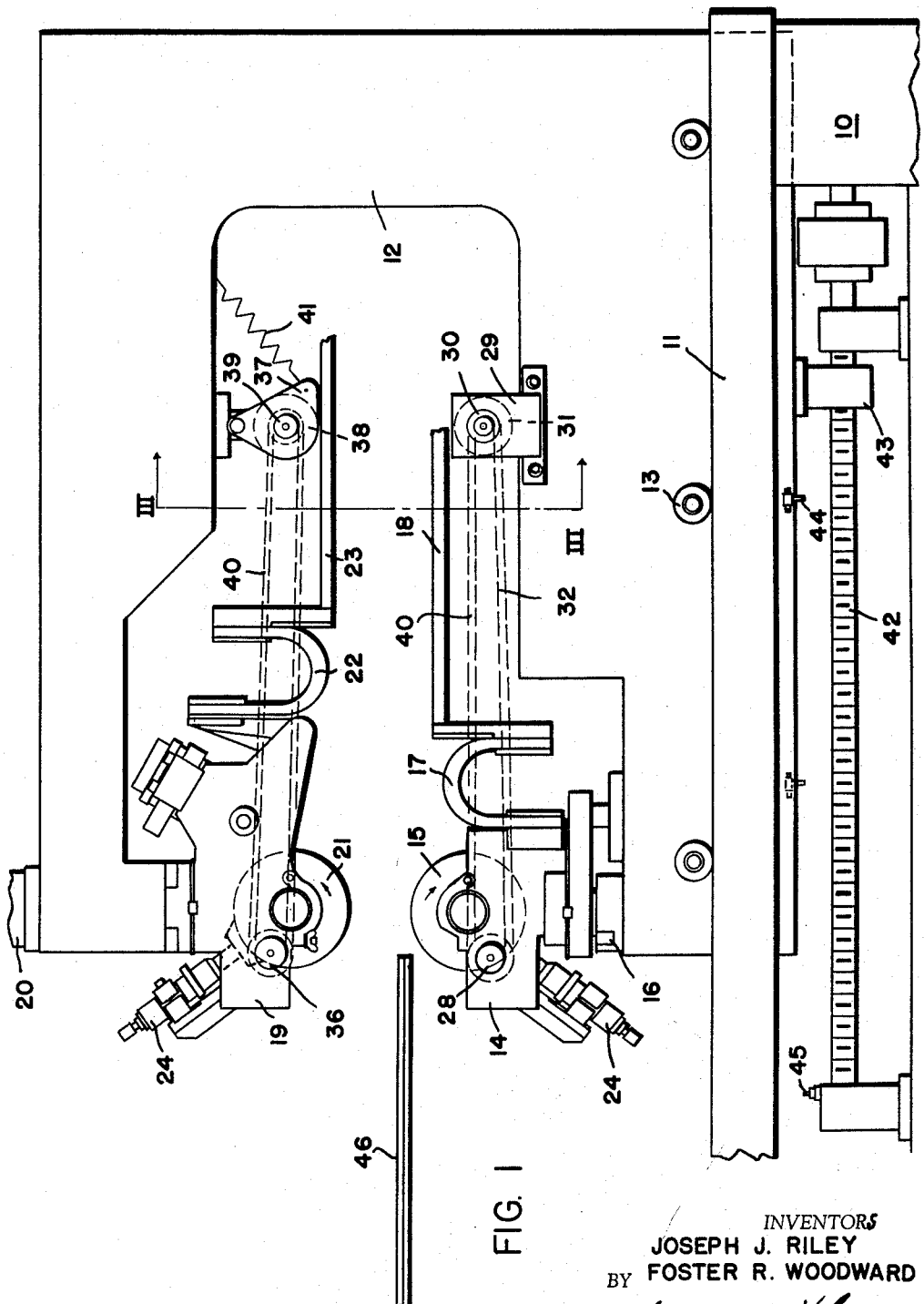

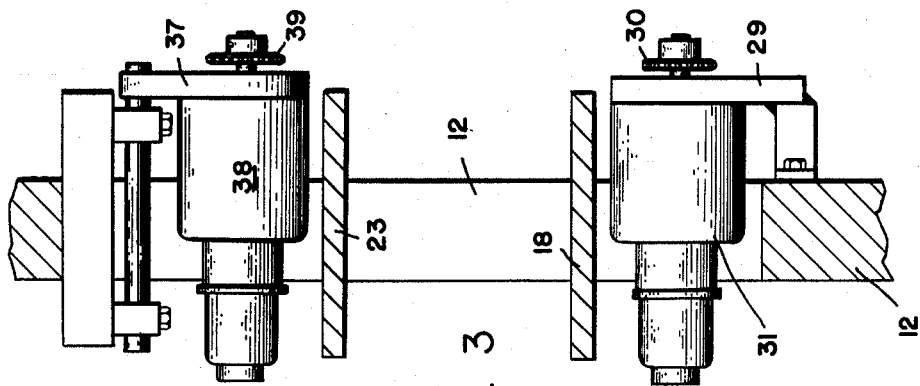
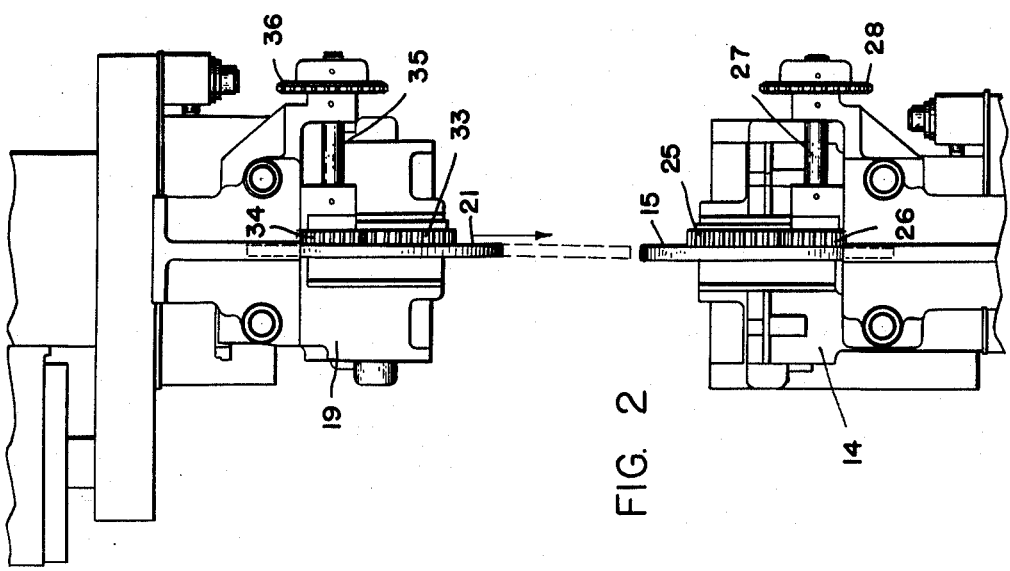

This invention relates to seam welders of the kind in which a rotary electrode has its peripheral speed correlated with the work primarily by frictional interengagement between the electrode and work and has as its principal object the elimination of certain objectional operating characteristics of this relatively simple kind of machine. In such apparatus the work may be moved relative to the axis or axes of one or a pair of rotary electrodes but a more common arrangement is to clamp the work (strip for example) in a fixed position and by means of a carriage move the electrode or electrodes into engagement with the work. Whatever the specific machine arrangement, the rotary electrode or electrodes must accelerate to welding speed as the work is contacted and must thereafter be driven at welding speed—all by the force developed by the frictional interengagement with the work. Due to the substantial mass and inertia of the electrodes and their mountings and considerable friction inherent in the necessary rotary welding current transfer devices the peripheral driving forces commonly cause slippage between the electrodes and work. This is objectionable for the following reasons.

When welding thin workpieces the larger forces and greater slippage occurring as the electrodes contact and move up onto the stock causes the stock edges to buckle which not only mutilates the work but also delays the start of sound welding. When welding coated workpieces such as tin plate or galvanized sheet or strip, for example, slippage greatly increases the pickup of the coating material by the electrodes which contaminates the latter, decreases the quality of the weld or welds, and, of course, further damages the work due to the appearance of unprotected areas. It is accordingly highly desirable to avoid slippage between the electrodes and work and this is accomplished in a novel and very practical manner by the present invention.

In seam welding machines where the rotary electrodes are positively driven difficulty is encountered in synchronizing the peripheral speed of the welding wheels with the relative speed of the work and welding throat, particularly if the wheels are gear driven. If knurled peripheral drivers are used the resulting knurled imprint is transferred to the work and may be detrimental, particularly when welding thin or coated stock. In the apparatus of our invention, however, the peripheral edges of the wheels remain smooth and concentric and high-quality delicate welding may be accomplished.

We accomplish the object of our invention by applying a kind of high-slip or "helper" drive to the rotary electrodes which is set up to provide a free-wheeling peripheral speed in the immediate range of the desired welding speed. The power train used is of such character, however, that the electrodes may readily slow down or speed up to exact welding speed by the influence of only slight frictional forces acting tangentially on the peripheries of the electrodes. These forces are much smaller than they would be if slippage occurred and are insufficient to cause buckling or removal of coatings. Any power or transmission means having high-slip characteristics may be used. For example, we may employ a rotary type of air motor which is preferred because of its simplicity, low cost, and ease of free-running speed regulation simply by varying the pressure of the air supplied. Magnetic clutches and various kinds of hydraulic couplings driven by electric motors may also be used.

The above and other objects and advantages of the invention will become apparent upon consideration of the following specification and accompanying drawing wherein there is disclosed a preferred embodiment of our invention.

In the drawing:
FIGURE 1 is a side elevation of an electric resistance seam welder constructed in accordance with the principles of this invention;
FIGURE 2 is a fragmentary end view of the apparatus of FIGURE 1; and
FIGURE 3 is a fragmentary sectional view taken along the line III—III of FIGURE 1.

The illustrated seam welder to which the invention is applied is of more or less known construction having a base 10 mounting a track 11 on which is movably supported a C-frame 12 by means of anti-friction rollers 13. On the free end of the lower leg of the frame 12 is mounted a conductive carrier 14 rotatably mounting a lower electrode wheel 15 and having suitable means 16 for adjusting its vertical position so that the top of the electrode 15 will have proper engagement with the work. Carrier 14 is connected through a flexible band 17 to a heavy conductor 18 which leads to one of the secondary terminals of the welding transformer, not shown.

Slidably mounted for vertical movement in the free end of the C-frame 12 is a second conductive carrier for mounting the upper electrode wheel 21. Carrier 19 is arranged to be moved upwardly and downwardly and to have welding force transmitted through it by a cylinder 20 which is carried on top of the frame 12. Welding current is supplied to the electrode 21 through the carrier 19 and the flexible band 22 leading to a heavy fixed conductor 23 which, in turn, is connected to the other secondary terminal of the welding transformer. It is well recognized in the electric resistance seam welding art that the conduction of the required heavy welding currents to the rotary electrodes presents a considerable problem and that many structural arrangements have been proposed to efficiently conduct these currents to rotary members without excessive resistive heating and without excessive mechanical friction. In practice, one such arrangement is utilized in the rotary joints between the shafts of the wheels 15, 21 and the carriers 14, 19, but whatever the arrangement, considerable starting friction is inherent in the apparatus. This starting friction coupled with the substantial mass and inertia of the rotary electrodes and shafts has heretofore caused difficulty when welding thin stock, particularly.

To overcome the above problem and also to insure the subsequent smooth and non-slipping traverse of the welding wheels across the work, we provide a high-slip drive for the electrode wheels 15, 21 by means of the following. Mounted on the shaft for the wheel 15 and in driving relation therewith is the gear 25 which meshes with a driving pinion 26 which, in turn, is driven through shaft 27 by a chain sprocket 28. A similar drive is provided for the upper wheel 21 by means of gear 33, pinion 34, shaft 35 and sprocket 36. Sprocket 28 is driven through an endless chain 32 by a sprocket 30 which is driven by a gear air motor 31 carried on the frame 12 by means of bracket 29. The air motor and the drive linkage between the same and the wheel 15 are so selected that sufficient power supplied to the wheel 15 to overcome mechanical friction and when the wheel is in a free state to rotate the same at a peripheral speed only slightly higher than the set welding speed of the seam welder. In the specific embodiment illustrated the overlapped workpieces 46 would be held in fixed clamps, not shown, and the welding speed would be determined by the speed of rotation of the drive screw 42 which has screw-threaded connection with a member 43 projecting downwardly from the frame 12. Of course, suitable means, not shown, and preferably housed in the base 10 is provided to drive the screw 42 at variable rates of speed.

Upper electrode 21 is driven similarly to electrode 15 by means of an air motor 38 acting through sprocket 39 and a chain 40 which is entrained over sprocket 36. Air motor 38 is carried by a spring biased swinging bracket 37 to permit of substantial vertical movement of the upper electrode 21 as will be understood.

When operating the apparatus described above, the electrodes 15 and 21 may be accelerated to their slightly excess welding speed by applying air to the motors 31 and 38 while the electrodes are still apart. After they contact and welding force is applied the welding current may be turned on and simultaneously the drive for screw 42 may be activated to begin the welding traverse. The work 46 is, at this time, of course, rigidly held in suitable clamps and welding begins as soon as the electrodes contact and move up onto the work. By regulating the air pressure supplied to the motors 31, 38 the power applied to the electrodes 15, 21 may be brought down to only slightly above that required to maintain free rolling action of the electrodes. This power is far below the potential available from the tangential frictional forces acting through the radii of the electrodes 15, 21 during welding traverse, and therefore the electrodes 15, 21 instantly stall down to peripheral speeds synchronous with the welding speed. As a result, the electrodes roll up onto the work in a smooth manner without any buckling or distortion of the work in the direction of weld and without any slippage between the electrodes and the work. Likewise, during the remainder of the welding traverse no slippage occurs between the work and the electrodes. The lack of slippage greatly decreases the pickup of coating materials (tin, zinc, lead, etc.) by the electrodes and, further, the electrodes are subject to much less wear and deformation. Also, the arrangement greatly reduces stresses imparted to the work by the electrodes in the direction of weld so that there is a minimum of displacement of the molten and soft material, resulting in a sounder and better appearing weld.

In accordance with known practice, air hammers 24 are mounted on the carriers 14 and 19 and have contoured tool ends to fit over the peripheral portions of the wheels 15, 21, to maintain the same in sound uniform cross-sectional shape. The peening hammers 24 are preferably operated concurrently with the air motors 31, 38 so that the electrodes may be acted on and dressed over longer intervals of time than the intervals required for the actual welding. While the peening hammers 24 operate to reduce the adverse effects of pickup and electrode deformation, the overall efficiency is much further enhanced by the non-slip characteristic of the present invention.

Since the electrodes 15, 21 may tend to rotate at a peripheral speed slightly faster than the welding speed there is, of course, always a component of force exerted by the electrodes toward the softened metal just welded. Sometimes this causes buckling at the end of the weld. To avoid this we have provided a limit switch 45 which is engaged by an actuator 44 adjustably mounted on the frame 12. Actuator 44 is adjusted to operate switch 45 as the electrodes 15, 25 closely approach the end of the work, and through suitable obvious control means, not shown, the supply of air to the motors 31, 38 is cut off by actuation of switch 45.

Instead of the actuator 44 and switch 45 we may employ a synchronizing switch as shown in U.S. Patent No. 2,634,353 to shut off the air motors as the end of weld is approached.

For our purpose, air motors are probably best suited to drive the rotary electrodes because of their low torque characteristic at high or free running speed and because they inherently have a high-slippage characteristic whereby they may be very quickly and easily slowed down from their free running speeds by the application of a slight additional load. However, it is recognized that certain types of electric motors, hydraulic couplings, magnetic and friction clutches, etc. may be selected and/or tailored to impart our desired operating characteristic, and such alternate but equivalent methods are within the purview of our invention. Also, it should be obvious that the electrode or electrodes may be driven directly from the high-slip drive or drives by friction wheels engaging their peripheries instead of through the gearing utilized in the specific embodiment illustrated.

It should now be apparent that we have provided an improvement in electric resistance seam welders which accomplishes the objects initially set out. Without adding appreciable apparatus or cost to the simplest kind of such welders (free wheeling electrode or electrodes) we may now weld very thin and delicate stock without buckling or tearing and coated stock without stripping and with better consistent quality because of improved electrode maintenance.

While we have illustrated our invention as applied to a double opposed wheel seam welder where the wheels are carried by a movable frame it should be readily understood that the principles of the invention are equally applicable to machines in which the work is moved as well as to machines in which one of the electrodes is a conductive backup bar and only one rotary electrode is used. Therefore, since various changes may be made in the above specifically described embodiment of our invention without departing from the principles of our invention reference should be had to the appended claims in determining the scope thereof.

We claim:

1. In an electric resistance seam welder having a rotary welding electrode and means to effect relative movement of the electrode and the work to be welded at a desired welding speed, the improvement comprising a low-torque high-slip drive for said electrode to idle said electrode at a peripheral speed approximately equal to said welding speed, the arrangement being such that at the start of a welding cycle the electrode may be first brought up to said approximate speed and while so rotating be brought into contact with the work after which said electrode will be brought to exact welding speed by the retardive or assistive action of frictional engagement between the electrode and work.

2. Apparatus according to claim 1 further characterized in that said drive comprises a rotary type of air motor to which compressed air of different pressure may be supplied to vary the said peripheral speed of the electrode prior to engagement of the electrode with the work to thereby compensate for differences in welding speeds.

3. Apparatus according to claim 1 further including a peening hammer for engaging and contouring the periphery of the electrode, and means to rapidly actuate said hammer in a repetitive manner whereby the circumferential extent of the periphery of the electrode will be acted on during idling and welding rotation of the electrode.

4. Apparatus according to claim 1 further including adjustable means arranged to be actuated as the end of the line of weld is approached to de-energize said drive whereby said electrode leaves the work under rotation caused solely by the frictional engagement between the electrode and the work.

5. In an electric resistance seam welder of the kind having a frame with top and bottom members and means for mounting rotary electrodes on its top and bottom members and arranged to have relative movement with respect to workpieces to be welded together by said electrodes the improvement comprising a low-torque high-slip drive for the lower electrode mounted on the lower member of the frame and operative to idle said lower electrode at a peripheral speed approximately equal to said relative speed between said workpieces and said electrodes, and a similar drive for the upper rotary electrode mounted on the upper member of said frame.

6. Apparatus according to claim 5 further characterized in that the means mounting said upper electrode on said upper member includes means for moving said upper electrode toward and away from the lower electrode and for applying welding pressure to said upper electrode, and said driving means for the upper electrode being operative during any position of said upper electrode relative to said upper member.

References Cited in the file of this patent

UNITED STATES PATENTS

| | | |
|---|---|---|
| 1,282,502 | Wagner et al. | Oct. 22, 1918 |
| 1,787,039 | Gibb | Dec. 30, 1930 |
| 2,023,085 | Lavallee | Dec. 3, 1935 |
| 2,957,975 | Pearson | Oct. 25, 1960 |

FOREIGN PATENTS

| | | |
|---|---|---|
| 235,774 | Germany | June 20, 1911 |